Patented Feb. 17, 1931

1,792,863

UNITED STATES PATENT OFFICE

ROBERT B. PEET, OF TRONA, CALIFORNIA, ASSIGNOR TO AMERICAN POTASH & CHEMICAL CORPORATION, OF TRONA, CALIFORNIA, A CORPORATION OF DELAWARE

PROCESS OF CRYSTALLIZING BORAX FROM SOLUTION

No Drawing. Application filed April 16, 1929. Serial No. 355,664.

This invention relates to the production of single crystals of borax from concentrated aqueous solutions at a rapid rate. In particular this invention relates to crystallization of borax from essentially pure aqueous solutions, but may be applicable to solutions of complex nature containing crystallizable quantities of borax.

The usual method of crystallizing borax is by cooling a hot concentrated solution. In many cases such a solution may result from concentration and manipulation of natural brines, such, for example, as Searles Lake or Owens Lake brine. However, it often occurs that an undesirable grade of borax may be obtained from such a source, or directly from mineral deposits, which must be dissolved and recrystallized for the production of high grade borax. The process of this invention is useful in any of these instances, and it may be applied successfully to the crystallization of borax from liquors produced by decomposition of certain borate ores.

As an example of the application of the process of this invention, I have rapidly produced satisfactory single crystals of refined borax from a concentrated aqueous solution prepared from crude borax. This particular crude borax resulted from the evaporation, manipulation and cooling of Searles Lake brine. Due to the physical and chemical nature of the liquor and to the temperature of cooling, this crude borax was considered unfit for commercial purposes, containing small amounts of arsenates, phosphates, chlorides, etc. of sodium and potassium together with considerable dirt.

The crude borax as described or any other undesirable borax, is dissolved in pure water or in any suitable aqueous solvent, such as end liquor from previous crystallization of borax. The solution may be treated with suitable reagents for the removal of undesirable impurities, and filtered for the removal of insoluble matter, such as dirt, etc.

The resulting clear filtered liquor, which should preferably be saturated with borax at a high temperature, is then suitable for cooling for the precipitation of borax, the step to which the present invention is pertinent.

Cooling may be brought about in any one of a number of well known pieces of equipment suited to that purpose. When such a solution is cooled to cause the borax present to crystallize out, in order to obtain a granular product which may be removed as a sludge and which will not remain for the most part as a massive deposit adhering to the walls and bottom of the crystallizing vessel, some mechanical means are usually provided for the purpose of maintaining the growing crystals in suspension in the mother liquor.

Due to various causes such as surface tension effects, electrostatic effects and accidental collisions, the suspended crystals tend to come together to form groups of two or more crystals. If the degree of super-saturation as influenced by the rate of cooling is sufficiently high, these groups or aggregates may become firmly cemented together in a product composed of complex aggregates instead of single crystals.

It is the primary object of the present invention to provide a process by which borax may be precipitated as crystals from a solution or super-saturated solution of borax without the crystals being successively clustered together or cemented, but in place, to provide a process in which to a large extent, the crystals of borax are obtained in the precipitating process as single crystals.

Heretofore in order to produce single crystals of borax, it has always been found necessary to conduct the crystallizing procedure very slowly in order that a high degree of super-saturation may not at any time be attained. When the cooling is carried out slowly, the effects of mechanical agitation and abrasion which tend to disrupt any aggregated groups of crystals, may be sufficient to prevent these aggregates becoming permanently cemented together. From the standpoint of efficiency, however, it is highly desirable that crystallization be conducted as rapidly as possible in order to increase the output of the apparatus.

It is therefore a further object of the present invention to provide a process of rapidly precipitating borax as single crystals.

I have discovered that a highly super-saturated solution of borax can be caused to precipitate borax in single crystals rapidly, if there is added to the super-saturated solution at the start of the precipitation operations, a small amount of soap, fatty acid or other emulsion colloid of similar nature. The effect of the addition of soap is to prevent or suppress the aggregation of crystals to such an extent that although the crystallization may be conducted rapidly, the product resulting will consist mainly of single crystals.

The particular phenomena responsible for the effects of the process of this invention are somewhat obscure and not entirely known. However, this may be due to the effects of adsorption of the added emulsion colloid on the surfaces of the crystal nuclei or seeds. It also may reside in the fact that due to the presence of the emulsion colloid, the surfaces of the crystals become charged electrically and therefore the different crystals or seeds, tend to repel each other. Also, it may be due to the fact that protective films of adsorbed material are produced on the surfaces of the crystals, which films tend to prevent different crystals from coming into a sufficiently intimate contact that a permanent union may be effected between the crystals.

The effect is not a simple viscosity effect since substances like sugar which mainly tend to increase the viscosity of the solution are apparently without effect insofar as the prevention of crystal aggregation is concerned. Neither is it entirely an adsorption effect since many dyes and inorganic colloids are adsorbed by crystal surfaces, but here again there is no tendency towards the prevention of aggregation in the case of borax. Apparently the adsorption of an organic emulsion colloid is necessary, and a great variety of such colloids may be used and such colloids are also known as emulsoids, or lyophylic colloids.

The present invention, together with various additional objects and advantages thereof will best be understood from a description of the preferred form or example of a process embodying the invention. For this purpose I have hereafter described a preferred form or example of such process.

Any hot concentrated aqueous solution of borax is suitable for the process of the present invention. Since the object of producing single crystals of good structure is largely for the satisfaction of the trade, it is desirable that the solution be as free from objectionable impurities as practicable. However, I have found that even higher impurities may be tolerated in the present mother liquor than in mother liquors of past practice; due to the fact that the process of this invention produces single crystals more easily freed from the adhering liquor than the complex aggregated crystals produced prior to the inception of this invention.

Under conditions of operation hereafter described I employ a hot concentrated solution made from crude borax, water and a certain amount of end liquor from previous crystallizations. The hot solution is filtered for the removal of all solid foreign matter.

The borax solution thus obtained or a borax solution obtained in any other desired or preferred manner is then preferably cooled. I prefer to use a vacuum crystallizer in which the hot solution is cooled rapidly by reducing the pressure on the solution, evaporating part of the solution so as to cool the solution due to the loss of heat by vaporization of water vaporized by the pressure reducing operation. The solution in the cooling chamber is agitated by mechanical or any other preferred means in order to cause an orderly ebullition and also to maintain the crystals in suspension.

As an example of the process, the process is carried on in batches of solutions of approximately 2500 gallons. The solution at the start, contains approximately 16% anhydrous borax. ($Na_2B_4O_7$), and is at a temperature of about 80° C. The solution is cooled rapidly down to say 58° C. which is approximately 2° below the temperature at which such a solution would be just saturated in the mother liquor. If such a solution is then inoculated with a few pounds of fine borax crystals in order to start crystallization and the cooling continued until a temperature of 35° C. is reached, the crystals of borax precipitated will consist almost entirely of complex aggregates.

In accordance with the process of the present invention, the solution, previous to inoculating with fine borax crystals, has added about one pound of common laundry soap dissolved in about ten gallons of hot water. The solution is then inoculated with a few pounds of fine borax crystals and cooled to 35° C. In this case the borax crystals produced are found to consist almost entirely of perfect single crystals of borax.

Cooling, from 80° C. to 35° C. is accomplished in about two hours. However, the time may be varied from say one hour or less to four hours or more, according to the size of crystal desired. The size of the resulting crystal borax is largely dependent upon the time and manner of cooling. Single crystals not only have the advantage of a pleasing appearance, but have also been found more susceptible to satisfactory separation, washing and drying operations. Likewise single crystals of borax have a lesser tendency toward dehydration and caking in transit, than the irregular, broken or complexly aggregated crystals.

Since borax solutions are sufficiently alkaline to saponify fatty acids, I have found it more convenient to add the soap in the form of a fatty acid. Oleic acid being liquid at ordinary temperature has been found most convenient although other fatty acids, or mixtures thereof have been found just as efficacious for the purpose of my invention. From one-half to one pint of oleic acid is sufficient to suppress aggregation in a batch of 2500 gallons, that is, from one to two volumes of oleic acid to 40,000 volumes of borax solution.

It should be understood that alkali of the borax solution converts the oleic acid to soap so that it operates as an emulsion colloid just as in the case where laundry soap is added.

In the preferred form of this invention, the emulsion colloid is added just prior to the commencement of crystallization. It is desired that the seed formed at the beginning be of simple single structure. It is difficult to produce a single crystal product from aggregated seed. While it is possible to add the colloid or its essence, such as oleic acid, to the hot batch of liquor as its enters the cooler, I have found it preferable to add it as near the point of crystal inception as practicable. It is well known that soap solutions undergo certain physical or chemical changes upon standing, commonly known as ageing. I have found that the freshly prepared agent is considerably superior to one that has undergone ageing. In order to gain the maximum effect I prefer to add oleic acid to the liquor immediately prior to crystallization. However where conditions have made this method impracticable, satisfactory results have been obtained by adding the emulsion colloid or its essence sometime previous to the start of crystallization.

While I have described the precipitating process as carried out by cooling the solutions by vacuum or by vaporization of water content produced by reduction of pressure, I have found that any other convenient method of rapid cooling, such as the use of cooling coils, is effective for the purposes of this invention.

While there has been herein described a particular form or example of a process embodying the invention, well suited for carrying out the objects of the invention, it is to be understood that the process is not necessarily limited to the specific example given, but includes all such modifications and changes as come within the scope of the append claims.

I claim:

1. A process of crystallizing borax from aqueous solutions which precipitate substantially only borax on cooling which process comprises, adding an emulsion colloid to the solution and cooling the solution while agitating the same to precipitate borax, the emulsion colloid added being the type adapted to prevent aggregation of the crystals of borax precipitated.

2. A process of crystallizing borax from aqueous solutions which precipitate substantially only borax on cooling which process comprises, adding to the solution a quantity of emulsion colloid, cooling the solution and agitating the solution to precipitate borax crystals, the emulsion colloid added being of the type adapted to prevent aggregation of the crystals of borax precipitated, the precipitation being accelerated by the addition of seed crystals of borax.

3. A process of crystallizing borax from aqueous solutions which comprises, adding soap to the solution prior to crystallization, and bringing the solution to sufficiently low temperature as to permit the precipitation of the borax crystals, the soap operating to prevent aggregation of the crystals of borax precipitated.

4. A process of crystallizing borax from aqueous solutions which comprises, adding to the solution soap, adding seed crystals of borax, and reducing the temperature of the solution sufficiently to effect precipitation of borax crystals, the soap operating to prevent aggregation of the crystals.

5. A process of crystallizing borax from aqueous solutions which precipitate substantially only borax on cooling which process comprises, bringing the solution to a temperature and concentration at which the solution is near the saturation point with respect to borax, adding a solution of saponifiable material to the solution and cooling the solution to effect precipitation of crystals of borax, the saponifiable material operating to prevent aggregation of the crystals.

6. A process of crystallizing borax from aqueous solutions which precipitate substantially only borax on cooling which process comprises, bringing the solution of borax to a concentration of borax and temperature at which the solution is near the saturation point with respect to the borax, adding a saponifiable material to the solution and quickly cooling the solution to effect precipitation of the borax, the saponifiable material operating to prevent aggregation of the borax crystals.

7. A process of crystallizing borax from aqueous solutions which precipitate substantially only borax on cooling which process comprises, adding an emulsion colloid to the solution prior to crystallization in sufficient quantity to prevent aggregation of borax crystals upon subsequent precipitation, and rapidly cooling the solution while agitating the same to precipitate the borax crystals.

8. A process of crystallizing borax from aqueous solutions in which oleic acid is added to the solution in sufficient quantities to suppress the tendency towards aggregation of the crystals of borax which precipitate, and cooling the solution while agitating the same to produce a product consisting essentially of single crystals.

9. A process of crystallizing borax from aqueous solutions which precipitate substantially only borax on cooling which process comprises, adding an emulsion colloid to the solution in sufficient quantities to prevent aggregation of borax crystals when precipitating, then reducing the pressure on said solution in order to rapidly cool the solution, thereby precipitating borax crystals essentially as single crystals.

10. A process of crystallizing borax from aqueous solutions which precipitate substantially only borax on cooling which process comprises, adding an emulsion colloid to the solution in sufficient quantities to prevent aggregation of borax crystals when precipitating, then reducing the pressure on said solution in order to rapidly cool the solution, thereby precipitating borax crystals essentially as single crystals, and agitating the solution during the cooling effected by pressure reduction.

11. A process of crystallizing borax from aqueous solutions which precipitate substantially only borax on cooling which process comprises, adding an emulsion colloid to the solution in sufficient quantities to prevent aggregation of borax crystals when precipitating, then reducing the pressure on said solution in order to rapidly cool the solution, thereby precipitating borax crystals essentially as single crystals, and adding seed crystals to accelerate precipitation of the borax.

12. A process of crystallizing borax from aqueous solutions which precipitate substantially only borax on cooling which process comprises, adding an emulsion colloid to the solution in sufficient quantities to prevent aggregation of borax crystals when precipitating, then reducing the pressure on said solution in order to rapidly cool the solution, thereby precipitating borax crystals essentially as single crystals, agitating the solution during cooling and adding seed crystals to facilitate the precipitation of borax.

Signed at Trona, California, this 8th day of April, 1929.

ROBERT B. PEET.